May 22, 1951
H. ADCOCK
2,554,166
SCREW-THREAD ROLLING APPARATUS
Filed Jan. 17, 1949
2 Sheets-Sheet 1
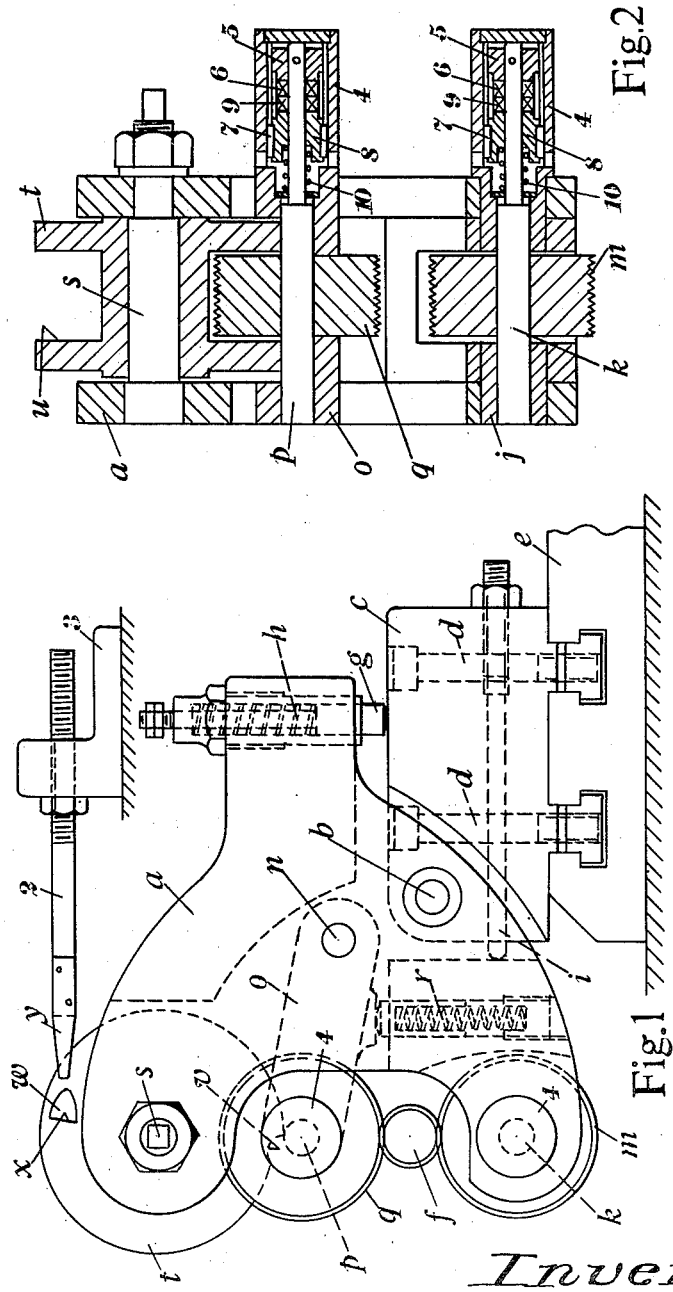
Inventor
H. Adcock
By Glascock Downing Reebold
Attys May 22, 1951   H. ADCOCK   2,554,166
SCREW-THREAD ROLLING APPARATUS
Filed Jan. 17, 1949   2 Sheets-Sheet 2
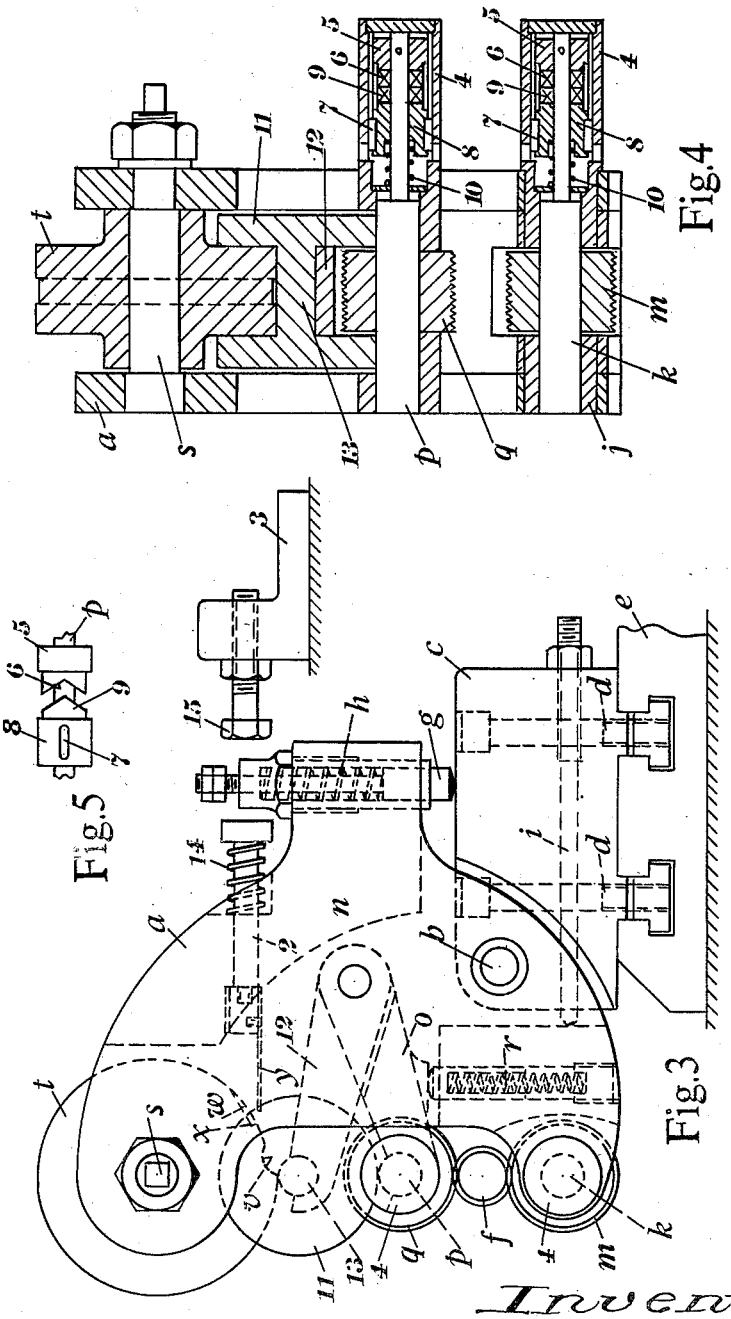
Inventor
H. Adcock Patented May 22, 1951

2,554,166

UNITED STATES PATENT OFFICE 2,554,166

SCREW-THREAD ROLLING APPARATUS

Horace Adcock, Shirley, Birmingham, England, assignor to A. C. Wickman Limited, Coventry, England Application January 17, 1949, Serial No. 71,231
In Great Britain February 3, 1948

4 Claims. (Cl. 80—6)

This invention has for its object to provide an improved screw-thread rolling apparatus of the kind whereby a pair of thread-forming rollers are adapted to operate simultaneously on opposite sides of, and to derive their rotary motion from, a rotary work piece.

The invention comprises the combination of a carrier adapted to be pivotally mounted on a slidable support and to carry one of the thread-forming rollers, means movably mounted on the carrier for supporting the other thread-forming roller, a rotary feed cam mounted on the carrier in operative association with, and adapted to move, the second roller relatively to the first roller, and means for co-ordinating the rollers.

In the accompanying sheets of explanatory drawings:

Figures 1 and 2 are respectively a side view and a sectional front view of screw-thread rolling apparatus in accordance with the invention.

Figures 3 and 4 are respectively similar views to Figures 1 and 2 illustrating a modified form of the invention.

Figure 5 is a detail view of a pair of the stop pieces employed for ensuring that the rollers come to rest in the required angular relationship.

Referring to Figures 1 and 2, the carrier $a$ consists of a body of substantially C-form. At one side it is attached by a pivot pin $b$ to a support $c$ adapted to be secured (as by bolts $d$) to a cross slide $e$ on the bed of a lathe or other like machine, the slide being movable at right angles to the axis of the work piece $f$. The carrier $a$ is loaded by a plunger $g$ under the action of a spring $h$ tending (by pressure on the support $c$) to move the carrier about its pivotal connection with the support, this movement being limited by an appropriately located and adjustable stop as $i$ on the support. In one end of the carrier is secured a bush $j$ carrying a spindle $k$ on which can be secured the thread-forming roller $m$. At an intermediate position on the carrier is pivotally attached by a pivot $n$ one end of an arm $o$ which at its outer end carries a spindle $p$ on which can be secured the other thread-forming roller $q$, the latter occupying a position in the open side of the carrier. The arm $o$ is loaded by a spring $r$ which is mounted on the carrier and is adapted to move the roller $q$ away from the roller $m$. On the other end of the carrier is freely secured a spindle $s$ on which is freely mounted a rotatable feed cam $t$. The cam is adapted to receive its motion by the frictional contact of its periphery with the spindle $p$ of the roller $q$, the rotating work piece $f$ being the source of motion of the thread-forming rollers and the feed cam. In the example shown in Figures 1 and 2, the arm $o$ is gapped at two positions (see Figure 2) to expose the spindle $p$ to the cam, and the latter is formed with a deep circumferential groove $u$ to provide a pair of end parts adapted to bear on the spindle. Moreover the periphery of each operative end part of the cam is formed with a recess $v$ for enabling the rollers to be separated from the work piece after each complete rotation of the cam.

Alternatively the cam may be adapted to co-operate with plain cylindrical parts formed on the ends of the associated roller, instead of with its spindle.

Further, there is provided in association with the cam any convenient means which by engagement with a stop on retraction of the slide causes the cam to be re-set in readiness for the next thread rolling operation. For example, there is formed in one of the end faces of the cam a recess $w$ presenting at one end a shoulder $x$ which when the slide is retracted engages one end of a flexible finger $y$, the latter being carried on a stem 2 which is adjustably supported by a bracket 3 mounted on any convenient fixed and adjacent part of the machine.

With each of the thread-forming rollers is associated any convenient device for co-ordinating the rollers, that is to say, for causing the rollers to come to rest in predetermined relative angular positions following disengagement of the rollers from the work piece. For example, the arm $o$ carrying $q$ has formed on or secured to one side of its outer end a tubular extension 4 enclosing an extended end of the spindle $p$ carrying the roller $q$, and to the spindle is secured a stop piece 5 having at one of its ends a V-shaped notch 6. (See Figure 5.) Within the part 4 is slidably secured by a key 7 a complementary stop piece 8 having at one end a V-shaped tooth 9. The adjacent ends of the stop pieces are held together by a spring 10. A similar device is provided at one end of the bush $j$ carrying the spindle $k$ of the roller $m$. During rotation of the rollers, the parts 5, 8 rotate and slide relatively to each other, and at the end of each rotation of the rollers ensure by their interaction that the rollers come to rest in the predetermined relative angular relationship.

When the rollers are mounted in position on the carrier and arm, their spacing is such that on advancing them into contact with opposite sides of the rotating work piece the contact-pressure between the rollers and work piece is sufficient to impart motion from the work piece to the rollers and cam. For example, the initial spacing of the rollers may be about .002 inch less than the diameter of the work piece.

The mode of action of the apparatus is as follows:

On advancing the slide $e$ of the machine, the thread-forming rollers $m$ $q$ are brought into contact with opposite sides of the work piece $f$ and the rollers and cam are thereby set in motion. By the action of the cam on the adjacent roller the latter is progressively pressed into deeper engagement with the work piece for the formation of the required thread. At the same time the reaction of this roller $q$ and the work piece $f$ causes the carrier $a$ to rock (against the spring $h$) through a small angle about its pivotal connection $b$ with its support $o$, causing the other roller $m$ to penetrate the work piece to the same extent as and simultaneously with the first roller. At the end of one complete rotation of the cam the gap $v$ in the latter causes the feeding action to cease, by allowing the rollers to be returned to a position clear of the work piece under the action of the springs $h$, $r$. The interaction of the parts 5, 8 also causes the rollers to come to rest in proper relative angular positions. On retracting the slide $e$ the shoulder $x$ of the cam recess $w$ comes into contact with the end of the finger $y$, and the cam is thereby given sufficient angular movement to restore it to its initial working position. The apparatus is then in condition for repeating the cycle of operations on the next work piece.

The example shown in Figures 3 and 4 is essentially similar to that above described, but differs in the following particulars. Between the thread-forming roller $q$ and the cam $t$ is mounted a roller 11 which is carried by an arm 12 pivoted at $n$ on the part $a$. The roller 11 is formed with a deep circumferential groove forming a spindle portion 13 which rests in a groove in the said arm 12. The cam $t$ is adapted to occupy the groove in the roller 11 and to bear on the portion 13. In the periphery of the cam is formed a recess $v$ similar to and for the same purpose as the corresponding gap shown in Figure 1, also in the periphery of the cam is formed a recess $w$ having an end $x$ which can co-operate with a finger $y$. In this case the finger $y$ is secured at one end of a stem 2 which is slidably supported on the carrier $a$ and is loaded by a spring 14. When the slide $e$ is retracted the stem 2 abuts against an adjustable stop 15 on a bracket 3 secured to an adjacent fixed part of the machine.

The mode of action of the example shown in Figures 3 and 4 is similar to that of the appliance shown in Figures 1 and 2, excepting that the cam $t$ co-operates with the roller 11 and the latter co-operates with the spindle $p$ of the thread-forming roller $q$.

By this invention I am able to ensure uniform action of the thread-forming rollers on opposite sides of the work piece and without risk of malformation of the required thread.

The invention is not, however, restricted to the examples above described, as constructional details may be modified to suit different requirements.

Having thus described my invention what I claim as new and desire to secure by Letters Patent is:

1. A screw-thread rolling apparatus comprising in combination a pair of thread-forming rollers adapted to operate simultaneously on opposite sides of, and to derive rotary motion from, a rotary work piece, a pivotal carrier on which one of said rollers is mounted, a movable member mounted on said carrier and carrying the second roller, a rotary feed cam mounted on said carrier and arranged to receive motion from said second roller as well as to move said second roller laterally towards the other roller, and means for co-ordinating said rollers so that they come to rest in a predetermined angular relationship following disengagement of said rollers from the work piece.

2. A screw-thread rolling apparatus comprising in combination a pair of thread-forming rollers adapted to operate simultaneously on opposite sides of, and to derive rotary motion from, a rotary work piece, a pivotal carrier on which one of said rollers is mounted, an arm pivotally mounted on said carrier and carrying the second roller, a rotary feed cam mounted on said carrier and arranged to receive motion from said second roller as well as to move said second roller laterally towards the other roller, a spring biassing said arm towards said cam, and means for co-ordinating said rollers so that they come to rest in a predetermined angular relationship following disengagement of said rollers from the work piece.

3. A screw-thread rolling apparatus comprising in combination a pair of thread-forming rollers adapted to operate simultaneously on opposite sides of, and to derive rotary motion from, a rotary work piece, a pivotal carrier on which one of said rollers is mounted, a movable member mounted on said carrier and carrying the second roller, a rotary feed cam mounted on said carrier and arranged to receive motion from said second roller as well as to move said second roller laterally towards the other roller, a re-setting member for co-operating with said cam, the latter being formed with a part with which said re-setting member is engageable to return said cam to its initial position after said rollers have performed a screw threading operation on the work piece, and means for co-ordinating said rollers so that they come to rest in a predetermined angular relationship following disengagement of said rollers from the work piece.

4. A screw-thread rolling apparatus comprising in combination a pair of thread-forming rollers adapted to operate simultaneously on opposite sides of, and to derive rotary motion from, a rotary work piece, a pivotal carrier on which one of said rollers is mounted, a movable member mounted on said carrier and carrying the second roller, a rotary feed cam mounted on said carrier, a motion- and pressure-transmitting roller supported by said carrier and arranged between said second roller and said feed cam so that said second roller is movable laterally towards the other thread-forming roller by said feed cam in response to rotary motion imparted to said feed cam from said second roller, and means for co-ordinating said thread-forming rollers so that they come to rest in a predetermined angular relationship following disengagement of said thread-forming rollers from the work piece.

HORACE ADCOCK.

REFERENCES CITED

The following references are of record in the file of this patent:

UNITED STATES PATENTS

| Number | Name | Date |
| --- | --- | --- |
| 2,204,182 | Gould | June 11, 1940 |
| 2,218,574 | Gould | Oct. 22, 1940 |

FOREIGN PATENTS

| Number | Country | Date |
| --- | --- | --- |
| 21,476 | Sweden | Oct. 27, 1906 |